(12) United States Patent
Xu

(10) Patent No.: US 12,181,491 B2
(45) Date of Patent: Dec. 31, 2024

(54) WATERPROOF REFLECTION UNIT AND ULTRASONIC ANEMOMETER

(71) Applicant: SHENZHEN FINE OFFSET ELECTRONICS CO., LTD., Shenzhen (CN)

(72) Inventor: Yuhong Xu, Shenzhen (CN)

(73) Assignee: SHENZHEN FINE OFFSET ELECTRONICS CO., LTD., Shenzhen (CN)

(*) Notice: Subject to any disclaimer, the term of this patent is extended or adjusted under 35 U.S.C. 154(b) by 213 days.

(21) Appl. No.: 17/708,900

(22) Filed: Mar. 30, 2022

(65) Prior Publication Data

US 2022/0229083 A1 Jul. 21, 2022

Related U.S. Application Data

(63) Continuation of application No. PCT/CN2019/125674, filed on Dec. 16, 2019.

(30) Foreign Application Priority Data

Sep. 30, 2019 (CN) .......................... 201910944773.8

(51) Int. Cl.
*G01P 5/24* (2006.01)
*G01P 1/02* (2006.01)

(52) U.S. Cl.
CPC .............. *G01P 5/245* (2013.01); *G01P 1/026* (2013.01)

(58) Field of Classification Search
None
See application file for complete search history.

(56) References Cited

U.S. PATENT DOCUMENTS 10,495,499 B2 * 12/2019 Campbell .............. G01F 1/662
2019/0128713 A1 5/2019 Campbell

FOREIGN PATENT DOCUMENTS

CN 102862516 A 1/2013
CN 204065127 U 12/2014
(Continued)

OTHER PUBLICATIONS

International search Report from Appl. No. PCT/CN2019/125674, mailed on Jun. 22, 2020.

(Continued)

*Primary Examiner* — Peter J Macchiarolo
*Assistant Examiner* — Jermaine L Jenkins
(74) *Attorney, Agent, or Firm* — Nevrivy Patent Law Group P.L.L.C.

(57) ABSTRACT

The disclosure relates to a reflection unit applied to an ultrasonic anemometer and used to reflect ultrasonic waves from a transmitter, wherein the reflected ultrasonic waves are received by a receiver. The reflection unit comprises a reflection plate and further comprises a mesh cover layer structure covering on the upper surface of the reflection plate. In an embodiment of the present disclosure, the mesh cover layer is provided on the reflection plate, so that the raindrops/water droplets falling on the reflection unit can be quickly scattered on the surface of the reflection unit, thereby eliminating the irregular shape and high liquid accumulation formed on the surface of the reflection unit, ensuring the accuracy of ultrasonic anemometer measurements in wind and rain conditions.

14 Claims, 7 Drawing Sheets

(56) References Cited

FOREIGN PATENT DOCUMENTS

| | | |
|---|---|---|
| CN | 105277737 A | 1/2016 |
| CN | 206399965 U | 8/2017 |
| CN | 207964871 U | 10/2018 |
| FR | 2800876 A1 | 5/2001 |
| FR | 2930346 A1 | 10/2009 |

OTHER PUBLICATIONS

English translation of International search Report from Appl. No. PCT/CN2019/125674, mailed on Jun. 22, 2020.

* cited by examiner

WATERPROOF REFLECTION UNIT AND ULTRASONIC ANEMOMETER

FIELD

The application relates to the field of measurement, and in particular, to a reflection unit and an ultrasonic anemometer.

BACKGROUND

Devices that use ultrasonic for measurement of wind are usually called ultrasonic anemometers, which use multiple ultrasonic probes to send and receive ultrasonic waves and measure speed and direction of wind by the time differences of ultrasonic waves propagating in the air.

Considering the relationship between the propagation distance and accuracy of ultrasonic waves, as well as the volume and cost of the device, the ultrasonic waves sent by the ultrasonic anemometer are usually received after being reflected by a reflection plate, whereas the situation of the reflection of the ultrasonic waves by the reflection plate will directly affect the measurement accuracy.

Ultrasonic anemometers are used in outdoor environment, where rain is the most frequent and one of the biggest factors affecting the reflection plate.

In order to reduce the accumulation of rainwater on the reflection plate, the reflection plate of the ultrasonic anemometer in the prior art is usually coated with nano-waterproof materials, so that the water droplets falling on the reflection plate can flow away as soon as possible. However, the cost of nano-waterproof materials is relatively high, which directly affects the costs of ultrasonic anemometer, whereas the life of nano-waterproof materials is quite short in outdoor environment. After two or three weeks, the waterproof effect begins to decrease, and after two or three months, the waterproof effect is completely lost, so that the user has to coat the nano-waterproof materials again to obtain higher accuracy, which further increases the use costs of the ultrasonic anemometer and reduces the convenience of the ultrasonic anemometer. The installation and maintenance costs are also quite high as the ultrasonic anemometer coated with nano-waterproof materials is installed outdoors.

It can be seen that the reflection plate coated with waterproof materials of the ultrasonic anemometer in the prior art has the problems of high cost, short life and difficult maintenance.

SUMMARY

Based on these, in order to solve or at least partially solve the above technical problems, the present disclosure provides a reflection unit and an ultrasonic anemometer, which can improve the measurement accuracy of the ultrasonic anemometer and reduce the cost.

In the first aspect, the present disclosure provides a reflection unit applied to an ultrasonic anemometer and used for reflecting ultrasonic waves from a transmitter, wherein the reflected ultrasonic waves are received by a receiver; and wherein the reflection unit comprises a reflection plate and a mesh cover layer covering an upper surface of the reflection plate.

Optionally, the upper surface of the reflection plate is a convex surface curved in the middle, or a structure of a combination of a plane and an inclined surface.

Optionally, a gap exists between the mesh cover layer and the reflection plate.

Optionally, a gap exists between the mesh cover layer and the reflection plate and a liquid channel exists between the mesh cover layer and the reflection plate so that the liquid flows out of the reflection unit via the liquid channel.

Optionally, a gap exists between the mesh cover layer and the reflection plate and the edge of the mesh cover layer is provided with an edge portion with a preset width, wherein the edge portion is in contact with the reflection plate and the thickness of the edge portion is greater than that of the mesh cover layer, so that a gap exists between the mesh cover layer and the reflection plate.

Optionally, a liquid channel exists between the mesh cover layer and the reflection plate and the edge portion is divided into a plurality of first edge parts and a plurality of second edge parts, the thicknesses of the first edge parts and the second edge parts are different, the thicknesses of the first edge parts and the second edge parts are greater than that of the mesh cover layer, and the first edge parts and the second edge parts are arranged at intervals.

Optionally, the mesh cover layer is made of a material with high reflectivity to ultrasonic waves.

Optionally, the mesh cover layer is made of a metal material.

Optionally, the mesh cover layer is made of a water-impregnated material.

Optionally, the area of the mesh cover layer is less than or equal to the area of the reflection plate.

Optionally, the mesh cover layer is provided with at least two fixed points for the mesh cover layer and the fixed points are configured to adhere and/or weld the mesh cover layer to the reflection plate.

Optionally, a support column is provided on the upper surface of the reflection plate and the support column is configured to connect the reflection plate with the ultrasonic anemometer.

Optionally, the fixed points are arranged on the edge portion of the mesh cover layer.

Optionally, a sunken bayonet is provided on the reflection plate and the mesh cover layer is inserted into the sunken bayonet to connect with the reflection plate.

In the second aspect, the present disclosure provides an ultrasonic anemometer, comprising the reflection unit disclosed in the present disclosure.

In an embodiment of the present disclosure, provided is a reflection unit applied to an ultrasonic anemometer, comprising a reflection plate for reflecting ultrasonic waves from a transmitter, wherein the reflected ultrasonic waves are received by a receiver, and wherein the reflection unit further comprises a mesh cover layer covering the upper surface of the reflection plate. In an embodiment of the present disclosure, the mesh cover layer is arranged on the reflection plate, so that the raindrops/water droplets falling on the reflection unit can scatter on the surface of the reflection unit more quickly, thereby reducing the thickness of the liquid accumulation on the surface of the reflection unit, reducing the impact of effusion on the test results and improving the accuracy and precision of the ultrasonic anemometer.

BRIEF DESCRIPTION OF THE DRAWINGS

The accompanying drawings, which are incorporated herein and constitute a part of the specification, illustrate embodiments consistent with the disclosure and together with the description serve to explain the principles of the disclosure.

In order to illustrate the embodiments of the present disclosure or the technical solutions in the prior art more clearly, the following briefly introduces the accompanying drawings that need to be used in the description of the embodiments or the prior art. It is obvious to those of ordinary skilled in the art that other drawings can be obtained from these drawings without any creative efforts.

DETAILED DESCRIPTION

Figure 1:
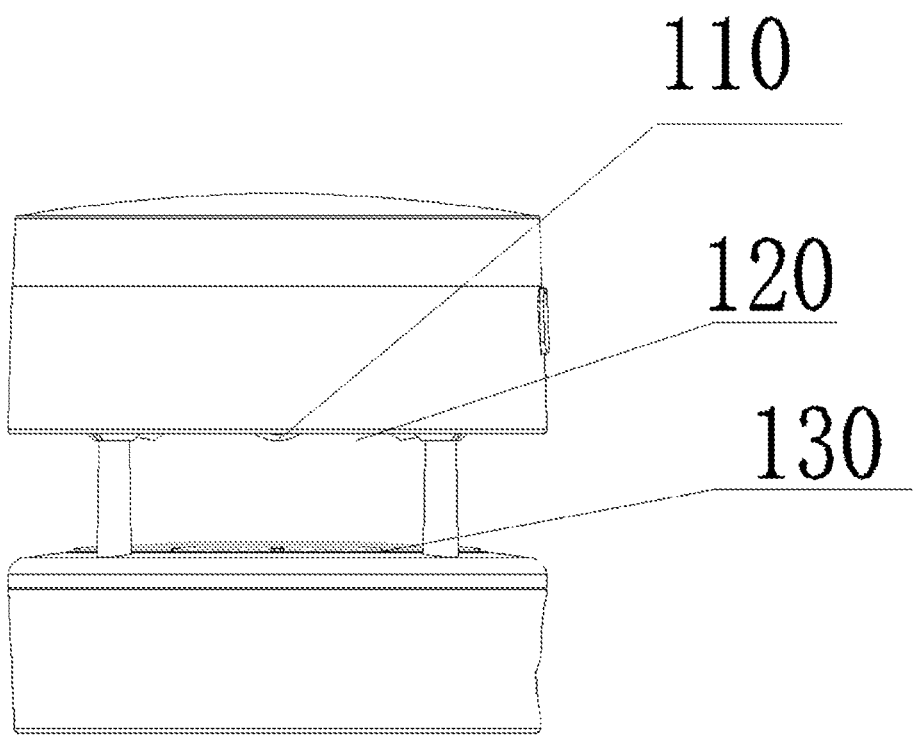
FIG. 1 shows a schematic structural diagram of an ultrasonic anemometer in an embodiment of the present disclosure.

FIG. 1 is a schematic structural diagram of an ultrasonic anemometer in an embodiment of the present disclosure.

As shown in FIG. 1, the ultrasonic anemometer comprises: a transmitter 110 configured to transmit ultrasonic waves; a receiver 120 configured to receive the reflected ultrasonic waves; a reflection unit 130 configured to reflect the ultrasonic waves from the transmitter 110, wherein the reflected ultrasonic waves are received by the receiver 120.

In FIG. 1, the specific locations of the transmitter 110 and the receiver 120 are not visible due to obstruction. The locations of the transmitter 110 and the receiver 120 correspond to the location of the reflection unit.

Figure 2:
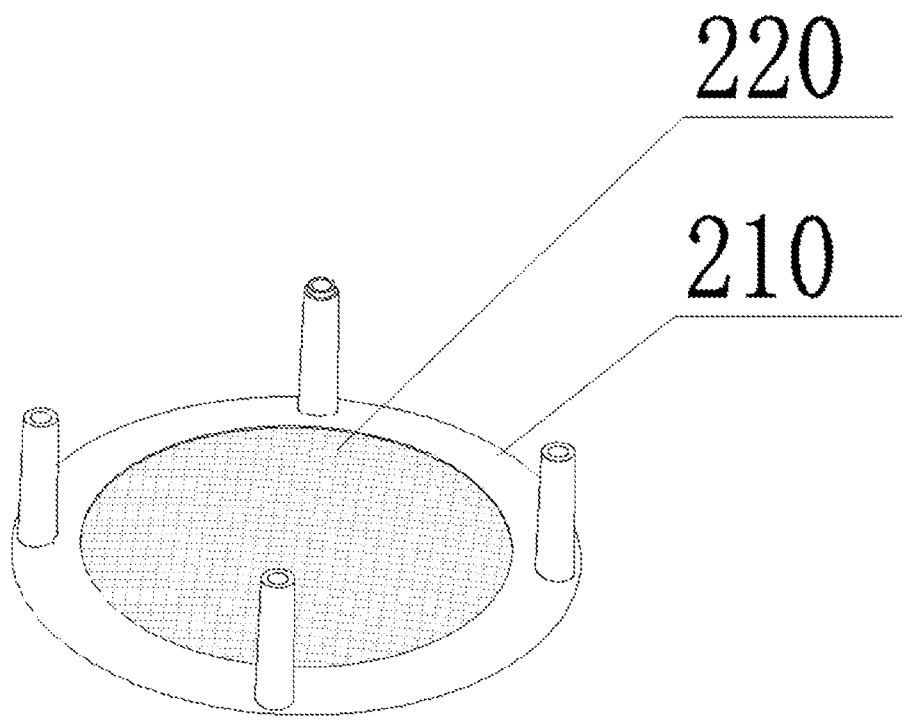
FIG. 2 is a schematic diagram of a reflection unit in an embodiment of the present disclosure.

FIG. 2 is a schematic diagram of a reflection unit in an embodiment of the present disclosure. As shown in FIG. 2, the reflection unit comprises a reflection plate 210 and a mesh cover layer 220 covering the upper surface of the reflection plate 210.

Figure 3:
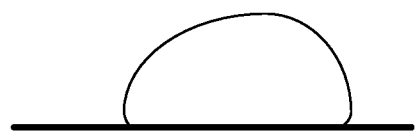
FIG. 3 shows a schematic diagram of raindrops falling on the reflection plate.

Ultrasonic anemometers are usually used outdoors and therefore raindrops will fall on the reflection plate. FIG. 3 shows a schematic diagram of raindrops falling on the reflection plate. As shown in FIG. 3, in the prior art, due to the effects of surface tension, raindrops are hemispherical.

Surface tension is the tension acting on any boundary along the surface of the liquid surface layer due to the unbalanced molecular attraction. In general, molecules at the interface and the molecules inside the body are subject to different forces. In the body, that is, inside the liquids, the resultant force of the forces surrounding a water molecule receiving by the water molecule is zero, but it is different for the water molecules on the surface of the liquids. Above the surface of the liquid is air, and the attractive force of gas-phase molecules to interface water molecules is smaller than that of liquid-phase molecules inside the liquids to interface water molecules, thus the resultant force received by the interface water molecules is not zero, and the direction of the resultant force is perpendicular to the liquid surface and points to the inside of the liquids, resulting the liquid surface to have a tendency to shrink automatically. This shrinkage force is called surface tension.

Due to the existence of the surface tension of the liquids, the raindrops will appear hemispherical, that is, the raindrops will be higher than the plane of the reflection plate. The hemispherical liquids will not flow away immediately due to the attraction, friction and the like between the molecules of the liquids and the reflection plate and becomes larger as more liquids drip onto the reflection plate, which will generate more liquid accumulations on the reflection plate. Even if the reflection plate can be physically inclined at a certain angle, it still cannot solve the problem of liquid accumulation on the reflection plate.

More and more liquids accumulate on the reflection plate. Since there can be a certain angle between the reflection plate and the horizontal plane, the liquids on the reflection plate will flow out from the edge of the reflection plate under the action of gravity. However, the reflection plate is not completely non-hydrophilic, so the flow of liquids will leave water marks on the reflection plate. Moreover, the water marks may be discontinuous.

The hydrophilicity of a substance means that the object having molecules with polar groups and having a large affinity for water can attract water molecules or dissolve in water. Briefly, there is a strong attraction between the substance and water. Thus, even if the liquids flow away, a part of the liquids will adhere to the reflection plate, thereby leaving traces.

Figure 4:
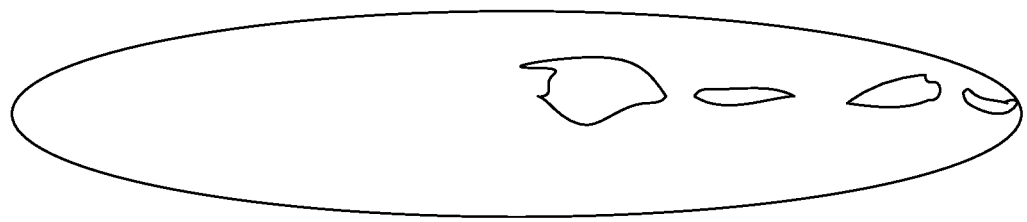
FIG. 4 shows a schematic diagram of water marks.

FIG. 4 shows a schematic diagram of the water marks. As shown in FIG. 4, in practice, under the action of gravity, hydrophilicity, friction, etc., the water marks are discontinuous, which leads to the fact that after the first liquid accumulation, the path of the liquids flowing out of the reflection plate may be random.

Raindrops fall with a certain momentum, which will cause sputtering when raindrops fall on the reflection plate. That is, multiple small water droplets will splash, and the landing points of the small water droplets are random, which makes the raindrops on the reflection plate more random when it rains.

This randomness makes it impossible for the ultrasonic anemometer to reduce or eliminate the influence of liquid accumulation on the reflection plate on the measurement result by a predetermined algorithm or predetermined means.

The refractive index, reflectivity and absorptivity of water are different from those of air and the plane of the reflection plate. Due to the existence of water droplets above the plane and the random accumulation of water droplets on the reflective surface, its shape and height are random, which may cause the ultrasonic path to change from reflection to scattering, resulting in a decrease in the amplitude of the reflected signal, and the change in the distance of the reflection path may cause a wrong detection result, resulting in a poor error in the detected wind speed.

In the prior art, in order to solve the above problems, a non-hydrophilic, i.e., waterproof, nano-coating is applied on the upper surface of the reflection plate.

The nano-coating is a non-hydrophilic substance, that is, the attraction between nano-coating and water molecules is small. Thus, applying nano-coating on the reflection plate can reduce the accumulation of water molecules on the reflection plate.

However, to prevent the liquids from accumulating completely or mostly on the reflection plate, high requirements for the application of nanomaterials are needed, which usually requires machine application to meet the requirements. However, the ultrasonic anemometer is used outdoors. When installing and leaving the factory, the reflection plate can indeed be coated with nano-coating by machine. However, as the nano-coating has a limited lifespan, the effect declines in about two weeks, and the nano-coating will be completely useless in two or three months. If it continues to apply the nano-coating by machine, returning the reflection plate to the factory is needed and the cost is extremely high. If the nano-coating is applied manually, the effect will be reduced.

In addition, the cost of the nano-coating itself is very high. Thus, the method of using the nano-coating in the prior art cannot solve the problems of the cost and the accuracy of the detection results.

Figure 5:
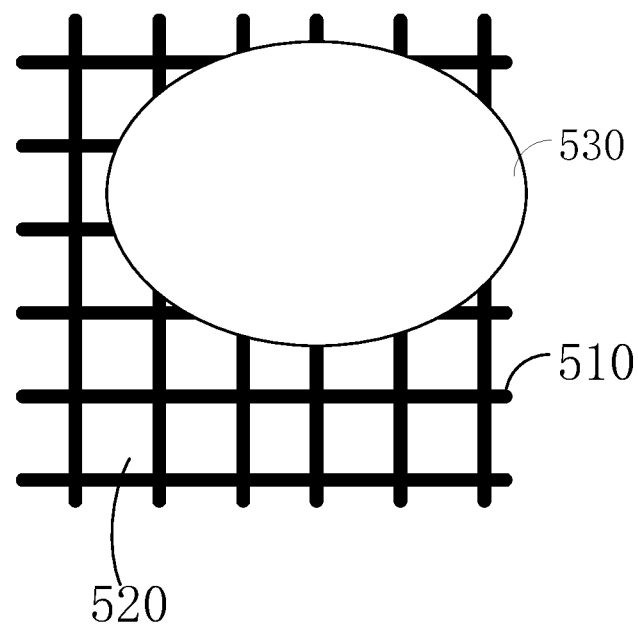
FIG. 5 is a top view of a mesh cover layer in an embodiment of the present disclosure.

In the reflection unit shown in FIG. 2 of the present disclosure, the upper surface of the reflection plate 210 is covered with a mesh cover layer 220. FIG. 5 is a top view of a mesh cover layer in an embodiment of the present disclosure. As shown in FIG. 5, the mesh cover layer may comprise grid lines 510 and grids 520.

The status of raindrops 530 on the mesh cover layer is shown in FIG. 5.

In practice, the diameter of raindrops in nature is much larger than the size of one grid of the mesh cover layer in an embodiment of the present disclosure. For a clearer schematic representation in FIG. 5, the grid is larger and the raindrop is smaller.

Figure 6:
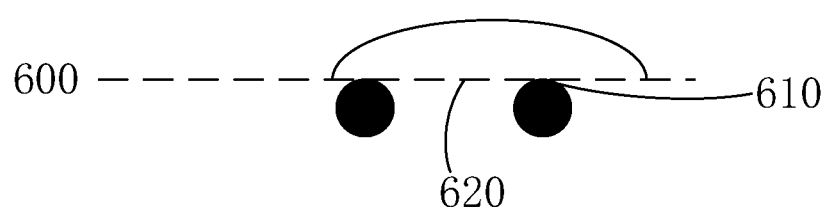
FIG. 6 is a schematic longitudinal cross-sectional view of a mesh cover layer in an embodiment of the present disclosure.

FIG. 6 is a schematic longitudinal cross-sectional view of a mesh cover layer in an embodiment of the present disclosure. As shown in FIG. 6, the mesh cover layer has a certain thickness, and the size of the grid is much smaller than the diameter of the raindrop but larger than the diameter of the water molecule, which makes raindrops experience different forces at different locations when falling on the mesh cover layer. At grid line 610, the liquids are subject to a support force upwards by the grid line 610 and gravity, while at grid 620, the liquids are only subject to gravity.

The diameter of the water molecules is much smaller than the size of the grid. Thus, the water molecules in the liquids in the grid will have a tendency to drip downwards under the action of gravity. With the accumulation of raindrops on the mesh cover layer, as the grid lines of the mesh cover layer have a certain thickness, a part of the raindrops located at the grid will fall beneath the surface of the mesh cover layer, that is beneath the dashed line 600 shown in FIG. 6.

A part of the raindrops fall beneath the surface of the mesh cover layer, which breaks the surface tension of the water droplets, so that the raindrops will spread out faster than that without the mesh cover layer when falling on the reflection unit. The flatter the raindrops spread out, the less they affect the reflection of the ultrasonic waves.

It can be seen that in an embodiment of the present disclosure, a mesh cover layer is arranged on the reflection plate, which can make the raindrops spread out faster to avoid raindrops from accumulating too high on the reflection plate, thereby reducing the influence of raindrops on ultrasonic reflection, and improving the accuracy and precision of the ultrasonic anemometers.

In practice, raindrops have a certain momentum when falling. The momentum makes the raindrop at grid 620 shown in FIG. 6 further being affected by inertia. Thus, the raindrop will fall beneath the surface of the mesh cover layer faster and spread out faster. At this moment, there will also be sputtering. As the sputtered water droplets also have momentum, raindrops will fall beneath the surface of the mesh cover layer faster.

It can be seen that, in an embodiment of the present disclosure, in practical application the mesh cover layer can make the raindrops disperse faster.

In an embodiment of the present disclosure, the mesh cover layer is arranged on the reflection plate, which will not affect the reflection of the ultrasonic wave by the reflection unit.

It is generally believed that the flatter the surface, the better the reflection of ultrasonic waves, light waves, electromagnetic waves, etc., and the better the test results. However, for different test equipment, non-flat surfaces will not affect the final test results.

In an embodiment of the present disclosure, a mesh cover layer is arranged on the reflection plate, which causes the reflection surface of the ultrasonic wave to become uneven. However, in the ultrasonic anemometer, the exit diameter of the transmitter is on the order of centimeters. Furthermore, the transmitter is launched obliquely and the emitted ultrasonic waves have certain dispersions. Thus, the reflection spot of the ultrasonic waves on the reflection plate is even larger. The size and thickness of the grid of the mesh cover layer are 0.1 mm or less. The grid lines can reflect ultrasonic waves, and the reflection plates in the grid can also emit ultrasonic waves. Even if there is diffuse reflection, the reflection unit in an embodiment of the present disclosure will still reflect most of the ultrasonic waves.

In an embodiment of the present disclosure, the length of the path of the ultrasonic wave is more than 5 cm, while the change of the path caused by the thickness of the mesh cover layer on the reflection plate is only 0.1 mm. Thus, the path error rate is less than 0.2%. The ultrasonic anemometer uses ultrasonic waves to detect the wind speed and wind direction, based on the generated time difference of paths. If the size of the grids and the thickness of the mesh cover layer are determined, the influence on the reflected ultrasonic waves can be determined or estimated. Thus, the influence caused by the mesh cover layer in the detection results can be corrected, so that even if the mesh cover layer is provided, the detection results of the ultrasonic anemometer will not be influenced.

In an embodiment of the present disclosure, provided is a reflection unit applied to an ultrasonic anemometer, comprising a reflection plate for reflecting ultrasonic waves from a transmitter, wherein reflected ultrasonic waves are received by a receiver and wherein the reflection unit further comprises a mesh cover layer covering the upper surface of the reflection plate. In an embodiment of the present disclosure, since the mesh cover layer is arranged on the reflection plate, the raindrops/water droplets falling on the reflection unit can be scattered on the surface of the reflection unit more quickly, thereby reducing the thickness of liquid accumulation on the surface of the reflection unit and the impact of liquid accumulation on the test results, and improving the accuracy and precision of the ultrasonic anemometer.

In an embodiment of the present disclosure, the upper surface of the reflecting plate is a central convex curved surface.

The central convex curved surface can lead to a certain angle between the upper surface of the entire reflection plate and the horizontal plane, so as to speed up the flow rate of the liquids. Therefore, the liquids falling on the reflection unit can be dispersed and flow out faster, thereby reducing the thickness of the accumulated liquids on the surface of the reflection unit and the influence of the accumulated liquids on the detection results, and improving the accuracy and precision of the ultrasonic anemometer.

In an embodiment of the present disclosure, a gap exists between the mesh cover layer and the reflection plate.

In an embodiment of the present disclosure, the mesh cover layer is covered on the reflection plate instead of being closely attached to the reflection plate, so that a gap exists between the mesh cover layer and the reflection plate. As shown in FIG. 6, the existence of the gap between the mesh cover layer and the reflection plate may refer to a gap between the grid lines 610 of the mesh cover layer and the reflection plate.

Although such a gap may be small, relative to the volume of water molecules, such a gap is still large enough for the water molecules to pass through. Thus, a gap exists between the mesh cover layer and the reflection plate, which can facilitate the flow of liquids, so that the liquids flow out as quickly as possible.

In addition, the existence of the gap between the mesh cover layer and the reflection plate can disrupt the balance of the surface tension of the liquids, so that the liquids can be dispersed more quickly.

Neither the reflection plate nor the mesh cover layer is completely non-hydrophilic. Thus, raindrops can be infiltrating liquids for both. As a result, rainwater can be attached to the mesh cover layer and/or the reflection plate. The existence of the gap and the existence of gravitational attraction between the water molecules of the liquids make the liquids falling into the grids adhere to the grid lines, while the water molecules of the liquids at the grid lines and in the gap will also have an attraction to the water molecules of the liquids in the grids, which will attract the water molecules to flow out of the gap faster.

It can be seen that the existence of the gap between the mesh cover layer and the reflection plate can accelerate the dispersion and outflow of the liquids, thereby reducing the thickness of the accumulated liquids on the surface of the reflection unit, reducing the influence of the accumulated liquids on the detection results and improving the accuracy and precision of the ultrasonic anemometer.

In an embodiment of the present disclosure, the raindrops can be infiltrating liquids for both the reflection plate and the mesh cover layer, and a gap exists between the mesh cover layer and the reflection plate, which causes the liquids to penetrate between the mesh cover layer and the reflection plate. Namely, at the beginning when it first start to rain, the raindrops falling on the mesh cover layer will temporarily accumulate, but spread out quickly and enter the gap between the mesh cover layer and the reflection plate. Due to the hydrophilicity, there will be a certain amount of liquids between the mesh cover layer and the reflection plate. However, the liquids are dispersed. With raindrops continuing to fall on the surface of the reflection unit, due to the gravitational effect between the water molecules in the liquids, the liquids existing between the mesh cover layer and the reflection plate will make the raindrops spread out faster and enter the gap.

The liquids between the mesh cover layer and the reflection plate will exist for a certain period of time. At this moment, if the mesh cover layer is lightly pressed, the liquid will seep out.

Compared with the reflection plate without the mesh cover layer, a part of the liquids are retained between the mesh cover layer and the reflection plate, so that there will be no obvious water marks on the ultrasonic reflection surface nor disconnected watermarks, wherein the liquids continuously dripping onto the reflection unit will disperse faster and enter the gap, rather than flowing in an indeterminate direction as if there were no mesh cover layer. This reduces a lot of uncertainty in the ultrasonic anemometer in an embodiment of the present disclosure.

In an embodiment of the present disclosure, a gap exists between the mesh cover layer and the reflection plate, wherein the edge of the mesh cover layer is provided with an edge portion with a preset width, the edge portion is in contact with the reflection plate, and the thickness of the edge portion is greater than that of the mesh cover layer, so that a gap exists between the mesh cover layer and the reflection plate.

In an embodiment of the present disclosure, a gap exists between the mesh cover layer and the reflection plate, wherein a liquid channel exists between the mesh cover layer and the reflection plate, so that the liquid flows out of the reflection unit via the liquid channel.

The reflection plate is a central convex curved surface. If the mesh cover layer is flat, or the curvature of the mesh cover layer is different from that of the reflection plate, the mesh cover layer and the reflection plate will contact in the middle. However, besides the middle the gap will be slightly larger, and the gap can be regarded as liquid channels.

The existence of the liquid channel can accelerate the dispersion and outflow of the liquid, thereby reducing the thickness of the liquid accumulation on the surface of the reflection unit, reducing the influence of the liquid accumulation on the detection results, and improving the accuracy and precision of the ultrasonic anemometer.

Figure 7:
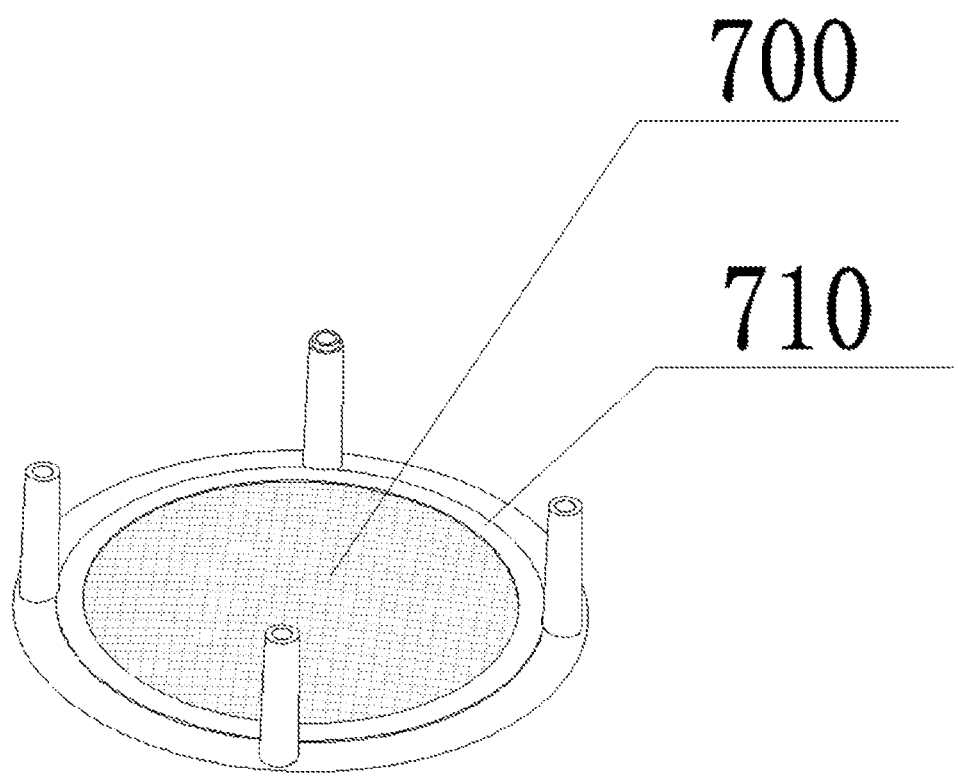
FIG. 7 is a schematic diagram of a mesh cover layer in an embodiment of the present disclosure.

FIG. 7 is a schematic diagram of a mesh cover layer in an embodiment of the present disclosure. As shown in FIG. 7, the edge of the mesh cover layer 700 is provided with an edge portion 710 in contact with the reflection plate 100, and the thickness of the edge portion 710 is greater than that of the mesh cover layer 700, so that a gap exists between the mesh cover layer 700 and the reflection plate 100.

Since both the mesh cover and the reflection plate are infiltrated by water, the flow of liquids between the mesh cover layer and the reflection plate may cause the mesh cover layer to adhere to the reflection plate more and more closely, making the gap between the mesh cover layer and the reflection plate smaller. The edge portion can maintain a gap between the mesh cover layer and the reflection plate, thereby accelerating the dispersion of the liquids, reducing the thickness of the accumulated liquids on the surface of the reflection unit, reducing the influence of the accumulated liquids on the detection results, and improving the accuracy and precision of the ultrasonic anemometer.

In an embodiment of the present disclosure, a liquid channel exits between the mesh cover layer and the reflection plate, wherein the edge portion is divided into a plurality of first edge parts and a plurality of second edge parts with different thickness, the thickness of the first edge parts and the second edge parts are larger than that of the mesh cover layer, and the first edge parts and the second edge parts are arranged at intervals.

Figure 8:
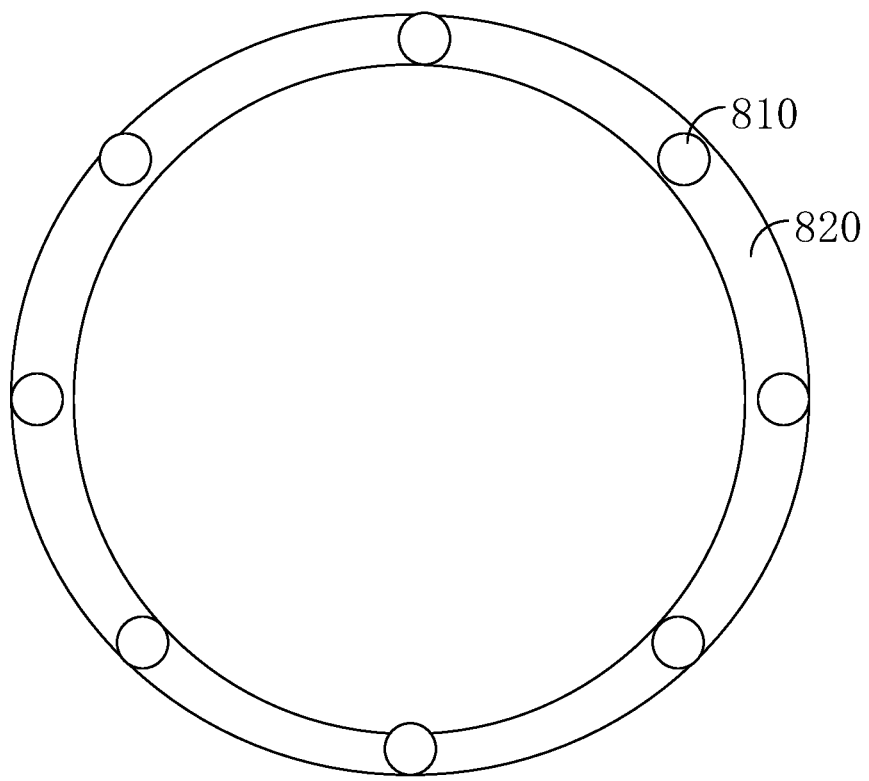
FIG. 8 is a schematic bottom view of the edge portion in an embodiment of the present disclosure.
Figure 9:
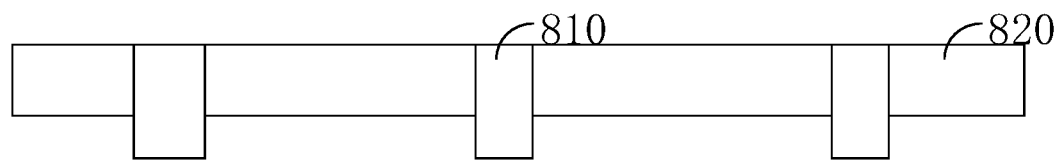
FIG. 9 is a schematic longitudinal cross-sectional view of an edge portion in an embodiment of the present disclosure.

FIG. 8 is a schematic bottom view of the edge portion in an embodiment of the present disclosure. The edge portion comprises a plurality of first edge parts 810 and a plurality of second edge parts 820. FIG. 9 is a schematic longitudinal cross-sectional view of the edge portion in an embodiment of the present disclosure.

Referring to FIG. 8 and FIG. 9, the thicknesses of the first edge parts 810 and the second edge parts 820 are greater than that of the mesh cover layer, which is shielded in FIG. 9 and not shown, the thickness of the first edge parts 810 differs from that of the second edge parts 820, and the first edge parts 810 and the second edge parts 820 are arranged at intervals.

The existence of the edge parts can maintain the gap between the mesh cover layer and the reflection plate, so that the liquid channel between the mesh cover layer and the reflection plate can be maintained.

The liquid channel can accelerate the dispersion and outflow of the liquids, thereby reducing the thickness of the liquid accumulation on the surface of the reflection unit, reducing the influence of the liquid accumulation on the detection results, and improving the accuracy and precision of the ultrasonic anemometer.

In an embodiment of the present disclosure, the mesh cover layer is made of a material with high reflectivity to ultrasonic waves.

The mesh cover layer made of a material with high reflectivity to ultrasonic waves can improve the power of reflecting ultrasonic waves and improve the accuracy and accuracy of the ultrasonic anemometers.

In an embodiment of the present disclosure, the mesh cover layer is made of a metal material, such as stainless steel, or other fiber materials.

In an embodiment of the present disclosure, the mesh cover layer is made of a water-infiltration material.

In an embodiment of the present disclosure, the area of the mesh cover layer is less than or equal to the area of the reflection plate.

In fact, the edge portion of the reflection plate does not need to reflect ultrasonic waves. Thus, the area of the mesh cover layer is smaller than that of the reflection plate, which can reduce costs.

In an embodiment of the present disclosure, the mesh cover layer is provided with at least two fixed points configured to adhere the mesh cover layer to the reflection plate.

In an embodiment of the present disclosure, the upper surface of the reflection plate is further provided with a support column configured to connect the reflection plate with the ultrasonic anemometer. In an embodiment of the present disclosure, the fixed points are provided at a position corresponding to the support column.

Figure 10:
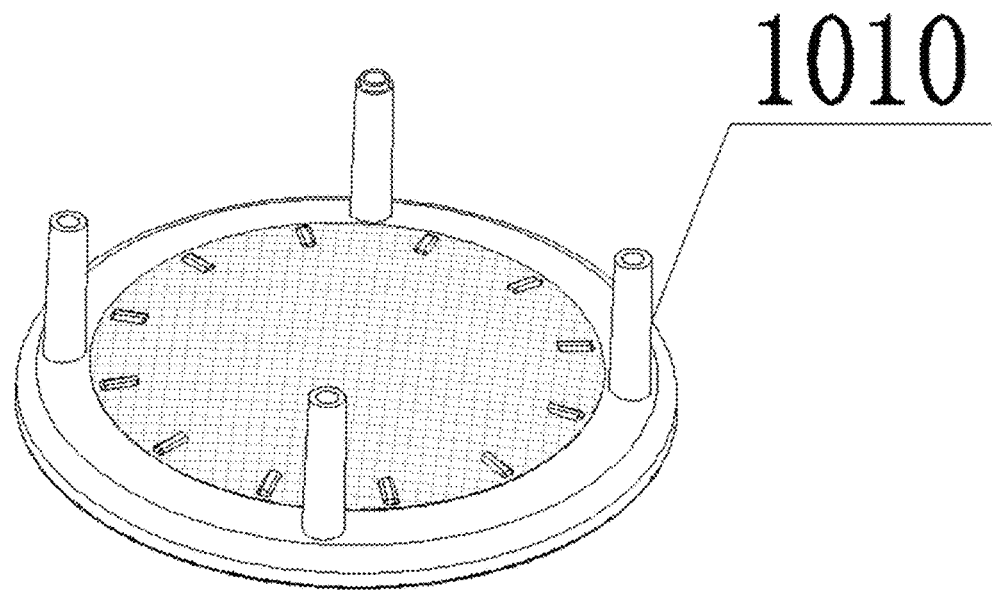
FIG. 10 is a schematic diagram of a reflection unit in an embodiment of the present disclosure.

FIG. 10 is a schematic diagram of a reflection unit in an embodiment of the present disclosure. As shown in FIG. 10, a support column 1010 is further provided on the reflection plate. There are four support columns 1010 in FIG. 10. The fixed points are welded, and the number of the fixed points exceeds the number of the support columns.

In other embodiments of the present disclosure, four fixed points may be provided, each of which is provided at the position of the support column.

The space between the reflection plate and the support column is configured to have the air/wind to be tested pass through. Thus, the number of support columns should not be too much. Otherwise, it will block the air and affect the test results. Similarly, the fixed points should not be too many or too protrusive to avoid blocking the air.

In an embodiment of the present disclosure, the fixed point is glued.

In an embodiment of the present disclosure, the fixed point and the reflection plate can be fixed by welding.

In an embodiment of the present disclosure, the fixed point is provided on the edge portion of the mesh cover layer.

In an embodiment of the present disclosure, the reflection plate is provided with a sunken bayonet, and the mesh cover layer is inserted into the sunken bayonet to connect with the reflection plate.

Figure 11:
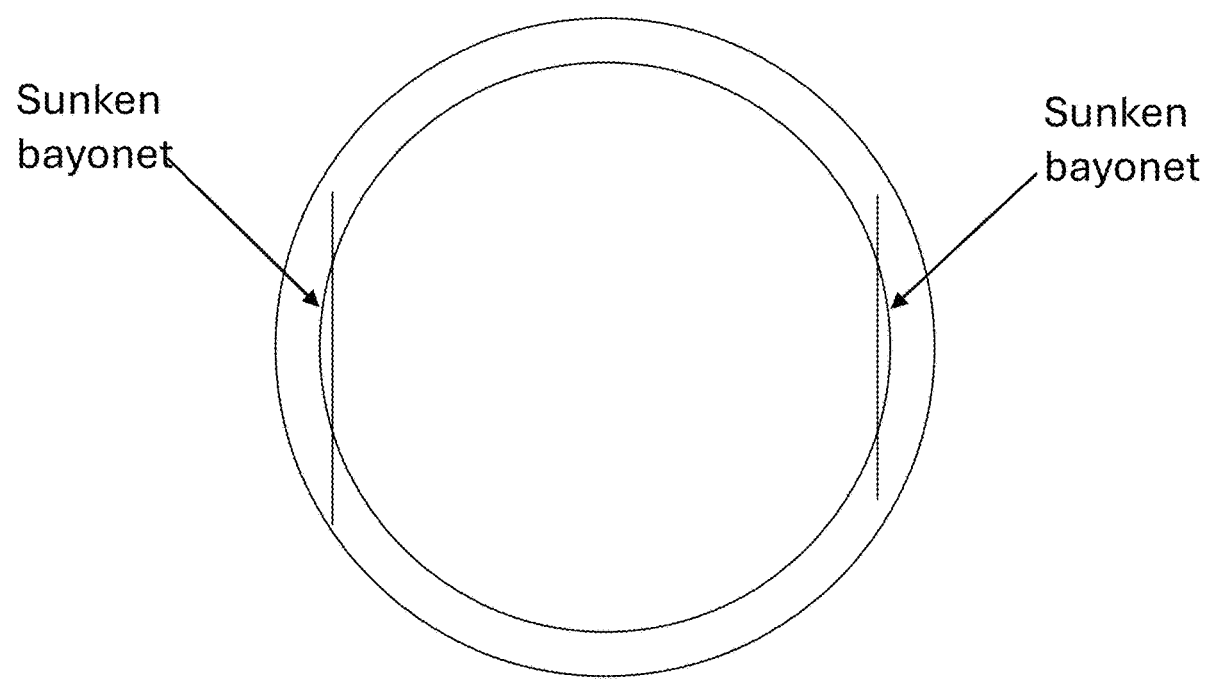
FIG. 11 is a schematic diagram of a reflection unit in an embodiment of the present disclosure.

FIG. 11 is a schematic diagram of a reflection unit in an embodiment of the present disclosure. As shown in FIG. 11, two sinking bayonets are provided on the reflection plate of the reflection unit, and the edge part of the mesh cover layer can be directly clamped into the sinking bayonets to fix the mesh cover layer.

In an embodiment of the present disclosure, the mesh cover layer may be fixed to the reflection plate via other structures, which will not be repeated here.

Figure 12:
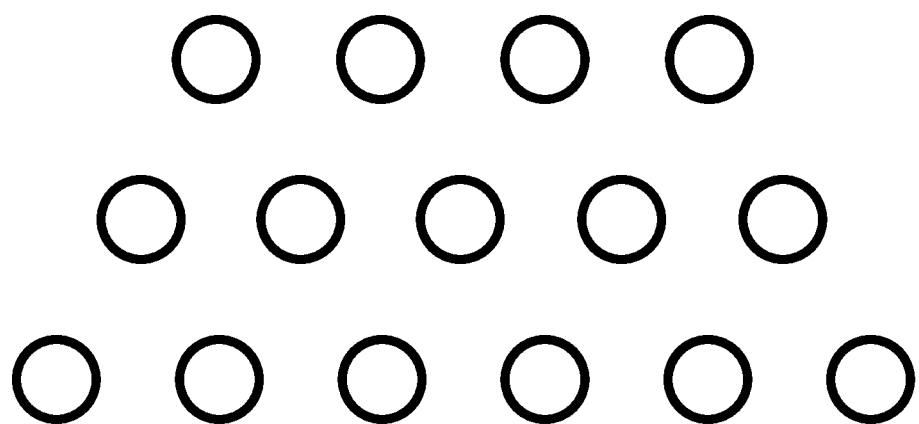
FIG. 12 is a schematic diagram of a mesh cover layer in an embodiment of the present disclosure.

In an embodiment of the present disclosure, the grids of the mesh cover layer may be a square as shown in FIG. 5, or may be circular, or triangular, or hexagonal, etc. The mesh cover layer may be a porous metal sheet, and the like, as shown in FIG. 12, or other integrally formed thin layers having grid lines and grid holes, which will not be repeated here.

The reflection unit in an embodiment of the present disclosure can accelerate the dispersion of the liquids, thereby reducing the thickness of the accumulated liquids on the surface of the reflection unit, reducing the influence of the accumulated liquids on the detection result, and improving the accuracy and precision of the ultrasonic anemometer.

In an embodiment of the present disclosure, the mesh cover layer may not comprise the edge portion. In this case, the mesh cover layer may have certain hardness to maintain a certain gap between the mesh cover layer and the reflection plate.

In an embodiment of the present disclosure, if the mesh cover layer does not comprise an edge portion, the fixed points may be directly disposed on the edge part of the mesh cover layer. The fixed points can be adhesive glued, or can be welded.

In an embodiment of the present disclosure, the mesh cover layer may have a certain curvature. The curvature of the mesh cover layer is different from that of the reflection plate. A certain gap can also be maintained between the mesh cover layer and the reflection plate.

Corresponding to the above reflection unit, in an embodiment of the present disclosure, provided is a method applied to an ultrasonic anemometer for controlling a reflection unit for reflecting the ultrasonic waves from the transmitter, wherein the reflected ultrasonic waves are received by the receiver; and wherein the method comprises providing a mesh cover layer so that the mesh cover layer covers the upper surface of the reflection plate.

In an embodiment of the present disclosure, the upper surface of the reflection plate is a convex curved surface in the middle.

In an embodiment of the present disclosure, a gap exists between the mesh cover layer and the reflection plate.

In an embodiment of the present disclosure, a gap exists between the mesh cover layer and the reflection plate, wherein a liquid channel exists between the mesh cover layer and the reflection plate, so that the liquid flows out of the reflection unit via the liquid channel.

In an embodiment of the present disclosure, a gap exists between the mesh cover layer and the reflection plate, wherein:

The edge of the mesh cover layer is provided with an edge portion with a preset width, the edge portion is in contact with the reflection plate, and the thickness of the edge portion is greater than that of the mesh cover layer, so that a gap exists between the mesh cover layer and the reflection plate.

In an embodiment of the present disclosure, a liquid channel exists between the mesh cover layer and the reflection plate, wherein the edge portion is divided into a plurality of first edge parts and a plurality of second edge parts, the thicknesses of the first edge parts and the second edge parts are different, the thicknesses of the first edge parts and the second edge parts are larger than that of the mesh cover layer, and the first edge parts and the second edge parts are arranged at intervals.

In an embodiment of the present disclosure, the mesh cover layer is made of a material with high reflectivity to ultrasonic waves.

In an embodiment of the present disclosure, the mesh cover layer is made of a metal material.

In an embodiment of the present disclosure, the mesh cover layer is made of a water-impregnated material.

In an embodiment of the present disclosure, the area of the mesh cover layer is less than or equal to the area of the reflection plate.

In an embodiment of the present disclosure, the mesh cover layer is provided with at least two fixed points configured to adhere or weld the mesh cover layer to the reflection plate.

In an embodiment of the present disclosure, the upper surface of the reflection plate is further provided with support columns configured to connect the reflection plate with the ultrasonic anemometer. The number of the fixed points on the mesh cover layer is the same as the number of the support columns.

In an embodiment of the present disclosure, the fixed points are provided on the edge parts of the mesh cover layer.

In an embodiment of the present disclosure, the fixed points are provided at a position corresponding to the support columns.

In an embodiment of the present disclosure, the reflection plate is provided with a sunken bayonet, the mesh cover layer is inserted into the sunken bayonet to connect with the reflection plate.

In the method of the embodiment of the present disclosure, the mesh cover layer is provided on the reflection plate, so that the raindrops/water droplets falling on the reflection unit can scatter on the surface of the reflection unit more quickly, thereby reducing the thickness of the accumulated liquids on the surface of the reflection unit, reducing the influence of the accumulated liquids on the detection result, and improving the accuracy and precision of the ultrasonic anemometer.

In an embodiment of the present disclosure, provided is an ultrasonic anemometer, as shown in FIG. 1, comprising:
- a transmitter 110 configured to transmit ultrasonic waves;
- a receiver 120 configured to receive the reflected ultrasonic waves;
- a reflection unit 130 configured to reflect the ultrasonic waves from the transmitter 110, wherein the reflected ultrasonic waves are received by the receiver 120;
- wherein the reflection unit 130 comprises a reflection plate and a mesh cover layer.

As shown in FIG. 2, the reflection unit comprises a reflection plate 210 and a mesh cover layer 220, wherein the mesh cover layer 220 covers the upper surface of the reflection plate 210.

In an embodiment of the present disclosure, the upper surface of the reflection plate is a convex surface curved in the middle.

In an embodiment of the present disclosure, a gap exists between the mesh cover layer and the reflection plate.

In an embodiment of the present disclosure, a gap exists between the mesh cover layer and the reflection plate, wherein a liquid channel exists between the mesh cover layer and the reflection plate, so that the liquid flows out of the reflection unit via the liquid channel.

In an embodiment of the present disclosure, a gap exists between the mesh cover layer and the reflection plate, wherein the edge of the mesh cover layer is provided with an edge portion with a preset width, the edge portion is in contact with the reflection plate, and the thickness of the edge portion is greater than that of the mesh cover layer, so that a gap exists between the mesh cover layer and the reflection plate.

In an embodiment of the present disclosure, a liquid channel exits between the mesh cover layer and the reflection plate, wherein the edge portion is divided into a plurality of first edge parts and a plurality of second edge parts, the thicknesses of the first edge parts and the second edge parts are different, the thicknesses of the first edge parts and the second edge parts are larger than that of the mesh cover layer, and the first edge parts and the second edge parts are arranged at intervals.

In an embodiment of the present disclosure, the mesh cover layer is made of a material with high reflectivity to ultrasonic waves.

In an embodiment of the present disclosure, the mesh cover layer is made of a metal material.

In an embodiment of the present disclosure, the mesh cover layer is made of a water-impregnated material.

In an embodiment of the present disclosure, the area of the mesh cover layer is less than or equal to the area of the reflection plate.

In an embodiment of the present disclosure, the mesh cover layer is provided with at least two fixed points configured to adhere the mesh cover layer to the reflection plate.

In an embodiment of the present disclosure, the upper surface of the reflection plate is further provided with support columns configured to connect the reflection plate with the ultrasonic anemometer. The number of the fixed points is the same as the number of the support columns.

In an embodiment of the present disclosure, the fixed points are provided on the edge portion of the mesh cover layer.

In an embodiment of the present disclosure, the fixed points are provided at a position corresponding to the support columns.

In an embodiment of the present disclosure, the reflection plate is provided with a sunken bayonet, and the mesh cover layer is inserted into the sunken bayonet to connect with the reflection plate.

In the embodiments of the present disclosure, the mesh cover layer is provided on the reflection plate, so that the raindrops/water droplets falling on the reflection unit can scatter on the surface of the reflection unit more quickly, thereby reducing the thickness of the accumulated liquids on the surface of the reflection unit, reducing the influence of the accumulated liquids on the detection result, and improving the accuracy and precision of the ultrasonic anemometer.

In an embodiment of the present disclosure, provided is an ultrasonic anemometer, comprising a reflection unit comprising a reflection plate for reflecting ultrasonic waves from a transmitter, wherein the reflected ultrasonic waves are received by a receiver and wherein the reflection unit further comprises a mesh cover layer covering the upper surface of the reflection plate. In an embodiment of the present disclosure, the mesh cover layer is provided on the reflection plate, so that the raindrops/water droplets falling on the reflection unit can scatter on the surface of the reflection unit more quickly, thereby reducing the thickness of the accumulated liquids on the surface of the reflection unit, reducing the influence of the accumulated liquids on the detection result, and improving the accuracy and precision of the ultrasonic anemometer.

It should be noted that, relational terms herein such as first, second etc. are only used to distinguish one entity or operation from another, but do not necessarily require or imply such actual relationship or sequence between these entities or operations. Moreover, the terms comprise, comprising or any other variation thereof are intended to encompass non-exclusive inclusion, such that a process, method, article or device that comprises a list of elements comprises not only those elements, but other elements not explicitly listed or other elements inherent to such process, method, article or device. Without further limitation, an element qualified by the phrase comprising does not preclude the presence of additional identical elements in a process, method, article or device that comprises the element.

The features mentioned above in the description, the drawings and the claims can be arbitrarily combined with each other as long as they are meaningful within the present disclosure. The features and advantages described for the sample analysis system according to the disclosure can apply in a corresponding manner to the sample analysis method according to the disclosure and vice versa.

The above descriptions are only specific embodiments of the present disclosure, so that those skilled in the art can understand or implement the present disclosure. Various modifications of these embodiments will be readily apparent to those skilled in the art, and the generic principles defined herein may be implemented in other embodiments without departing from the spirit or scope of the disclosure. Thus, the present disclosure is not intended to be limited to the embodiments shown herein, but is to be accorded the widest scope consistent with the principles and novel features claimed herein.

What is claimed is:

1. A reflection unit, comprising a reflection plate and a mesh cover layer covering an upper surface of the reflection plate, wherein a sunken bayonet is provided on the reflection plate and the mesh cover layer is inserted into the sunken bayonet to connect with the reflection plate.

2. The reflection unit of claim 1, wherein the upper surface of the reflection plate is a convex surface curved in the middle, or a structure of a combination of a plane and an inclined surface.

3. The reflection unit of claim 1, wherein a gap exists between the mesh cover layer and the reflection plate.

4. The reflection unit of claim 3, wherein the gap is a liquid channel existing between the mesh cover layer and the reflection plate, so that a liquid flows out of the reflection unit via the liquid channel.

5. The reflection unit of claim 3, wherein an edge of the mesh cover layer is provided with an edge portion with a preset width, the edge portion is in contact with the reflection plate, and a thickness of the edge portion is greater than that of the mesh cover layer, so that the gap forms between the mesh cover layer and the reflection plate.

6. The reflection unit of claim 5, wherein the edge portion is divided into a plurality of first edge parts and a plurality of second edge parts, thicknesses of the first edge parts and the second edge parts are different, the thicknesses of the first edge parts and the second edge parts are larger than that of the mesh cover layer, and the first edge parts and the second edge parts are arranged at intervals.

7. The reflection unit of claim 1, wherein the mesh cover layer is made of a material with high reflectivity to ultrasonic waves.

8. The reflection unit of claim 1, wherein the mesh cover layer is made of a metal material.

9. The reflection unit of claim 1, wherein the mesh cover layer is made of a water-impregnated material.

10. The reflection unit of claim 1, wherein an area of the mesh cover layer is less than or equal to an area of the reflection plate.

11. The reflection unit of claim 1, wherein the mesh cover layer is provided with at least two fixed points and the fixed points are configured to adhere and/or weld the mesh cover layer on the reflection plate.

12. The reflection unit of claim 11, wherein a support column is further provided on the upper surface of the reflection plate and the support column is configured to connect the reflection plate with the ultrasonic anemometer.

13. The reflection unit of claim 11, wherein the fixed points are provided on the edge portion of the mesh cover layer.

14. An ultrasonic anemometer, comprising the reflection unit of claim 1.

* * * * *